United States Patent [19]

Ishikawa

[11] Patent Number: 4,512,212
[45] Date of Patent: Apr. 23, 1985

[54] VEHICLE AUTOMATIC POWER TRANSMISSION HAVING A LOCK UP CLUTCH

[75] Inventor: Kazuo Ishikawa, Aichi, Japan

[73] Assignee: Aisin Seiki Kabushiki Kaisha, Kariya, Japan

[21] Appl. No.: 365,896

[22] Filed: Apr. 6, 1982

[30] Foreign Application Priority Data

Apr. 8, 1981 [JP] Japan ................... 56-052785

[51] Int. Cl.³ ............. F16H 47/00; F16H 57/10; F16D 33/00; B60K 41/22
[52] U.S. Cl. ......................... 74/733; 74/732; 74/752 C; 74/762; 74/869; 192/3.31; 192/3.57; 192/0.052
[58] Field of Search ............ 74/733, 732, 867, 878, 74/868, 869, 870, 752 C, 762, 731; 192/3.31, 3.57, 0.052, 0.062

[56] References Cited

U.S. PATENT DOCUMENTS

| 3,138,969 | 6/1964 | Fisher et al. | 74/677 |
| 3,497,043 | 2/1970 | Leonard | 192/0.052 |
| 3,810,531 | 5/1974 | Edmunds | 74/733 X |
| 3,818,783 | 6/1974 | Norris et al. | 74/867 |
| 3,985,046 | 10/1976 | Morris et al. | 192/3.31 |
| 4,095,486 | 6/1978 | Ohnuma | 74/733 X |
| 4,263,822 | 4/1981 | Harmon | 74/731 X |
| 4,294,140 | 10/1981 | Iwanaga et al. | 74/733 X |
| 4,349,088 | 9/1982 | Iko et al. | 74/733 X |
| 4,369,865 | 1/1983 | Sunohara et al. | 192/3.31 |
| 4,391,166 | 7/1983 | Kubo et al. | 192/3.31 X |
| 4,431,096 | 2/1984 | Kobayashi et al. | 74/733 X |
| 4,438,665 | 3/1984 | Schmidt | 74/731 X |
| 4,441,385 | 4/1984 | Taga et al. | 74/732 X |

Primary Examiner—Allan D. Herrmann
Assistant Examiner—Stephen B. Andrews
Attorney, Agent, or Firm—Finnegan, Henderson, Farabow, Garrett & Dunner

[57] ABSTRACT

An automatic power transmission including a torque converter and a planetary type multiple stage gear transmission unit. The torque converter is provided with a lock up clutch for mechanically connecting the converter pump with the turbine so that the engine output torque is directly transmitted to the gear transmission unit. The engagement of the lock up clutch is controlled by the difference between the governor pressure which represents the vehicle speed and the throttle valve kickdown pressure which indicates whether or not the engine throttle valve is in or substantially in the full open position so that the lock up clutch can be engaged at a relatively low speed under a normal operation.

5 Claims, 6 Drawing Figures

FIG. 4

|   |     | LC | CO | FO | BO | C1 | C2 INNER | C2 OUTER | B1 | B2 | F2 |
|---|-----|----|----|----|----|----|----------|----------|----|----|----|
| R |     |    | ●  | ●  |    |    | ●        | ●        |    | ●  |    |
| N |     |    | ●  | ●  |    |    |          |          |    |    |    |
| D | 4th | ○  |    |    | ●  | ●  | ●        |          |    |    |    |
| D | 3rd | ○  | ●  | ●  |    | ●  | ●        |          |    |    |    |
| D | 2nd |    |    | ◉  |    | ●  |          |          | ●  |    |    |
| D | 1st |    | ●  | ●  |    | ●  |          |          |    |    | ◉  |
| 3 | 3rd | ○  | ●  |    |    | ●  | ●        |          |    |    |    |
| 3 | 2nd |    |    | ◉  |    | ●  |          |          | ●  |    |    |
| 3 | 1st |    | ●  |    |    | ●  |          |          |    |    | ◉  |
| 2 | 2nd |    | ●  | ●  |    | ●  |          |          | ●  |    |    |
| 2 | 1st |    | ●  | ●  |    | ●  |          |          |    |    | ◉  |
| L |     |    | ●  | ●  |    | ●  |          |          |    | ●  | ●  |

● PARTS OF ENGAGEMENT

○ ENGAGEMENTS OVER PREDETERMINED VEHICLE SPEED

◉ ENGAGEMENTS ONLY WHEN DRIVEN

VEHICLE AUTOMATIC POWER TRANSMISSION HAVING A LOCK UP CLUTCH

The present invention relates to an automatic power transmission for power propelled vehicles and more particularly to an automatic power transmission having a torque converter and a lock-up clutch. More specifically, the present invention pertains to control means for such automatic power transmission.

In an automatic power transmission for power propelled vehicles having a torque converter, there is provided a planetary type multiple stage gear transmission unit so that the engine output is transmitted through the torque converter and the gear transmission unit to the vehicle propeller shaft. The planetary type gear unit has brakes and clutches which are selectively controlled in accordance with the load and speed of the vehicle to select an appropriate gear train. In this type of automatic transmission, particularly in high speed ranges wherein the engine is operated with the throttle valve wide open, the driving torque applied to the propeller shaft becomes lower when it is transmitted through the torque converter than in a case where it is transmitted directly from the engine output shaft to the gear transmission unit. More specifically, where the third or further high stage is selected in the gear transmission unit, the driving torque through the torque converter is lower than that directly transmitted from the engine output shaft to the gear transmission unit in the vehicle speed range greater than a certain value. Since the tendency causes a decrease in fuel economy and a poor acceleration under a high vehicle speed, conventional automatic power transmissions include lock-up clutches which are engaged in a high speed range so that the engine output torque is directly transmitted to the gear transmission unit.

The present invention has an object to provide novel means for controlling the lock-up clutch in an automatic power transmission.

Another object of the present invention is to provide an automatic power transmission having control means with which fuel economy can be improved with a satisfactory acceleration under a high speed range.

A further object of the present invention is to provide control means for an automatic power transmission in which engagement of the lock-up clutch is made at a relatively low speed with a low and medium opening ranges of the throttle valve to thereby provide an improved fuel economy.

According to the present invention, the above and other objects can be accomplished by an automatic power transmission comprising a fluid type torque converter adapted to be driven by an engine output shaft and having an output element, a planetary type multiple stage gear transmission unit having input element connected with said output element of said torque converter, said gear transmission unit having clutch and brake means which is adapted to be operated selectively to provide one of a plurality of gear trains having different gear ratios, hydraulic control circuit means for operating said clutch and brake means, lock-up clutch means provided between said engine output shaft and said input element of the gear transmission unit, said hydraulic control circuit means including a governor pressure line having a pressure corresponding to vehicle speed and a throttle valve kick-down pressure line, lock-up clutch control means for controlling the lock-up clutch means, said lock-up clutch control means including means operable under a pressure difference between the governor pressure line and the throttle valve kick-down pressure line.

According to a preferable aspect of the present invention, the gear transmission unit includes at least three stages which are selected by first-to-second shift valve means and second-to-third shift valve means, and said lock-up clutch control means is associated with a pressure line for supplying a pressurized hydraulic fluid to said lock-up clutch control means through said second-to-third shift valve means and said pressure difference operable means. According to the present invention, the actuation of the lock-up clutch means is controlled by the governor pressure which represents the speed of the vehicle on which the transmission is mounted and the throttle valve kick-down pressure which represents whether or not the throttle valve is fully or substantially fully open. Therefore, it is possible under a normal operation to have the lock-up clutch means engaged at a relatively low speed so as to provide an improved fuel economy. Under a wide open throttle valve position, the lock-up clutch means is engaged at a relatively high vehicle speed so that a satisfactory acceleration is ensured throughout the speed range.

The above and other objects and features of the present invention will become apparent from the following descriptions of a preferred embodiment taking reference to the accompanying drawings, in which:

FIG. 4 is a table showing the schedule of engagement of the clutches and brakes in the gear transmission unit to select a desired gear stage; and, FIG. 5 is a diagram showing the relationship between the selection of a gear stage in the gear transmission unit and the vehicle speed.

Figure 2:
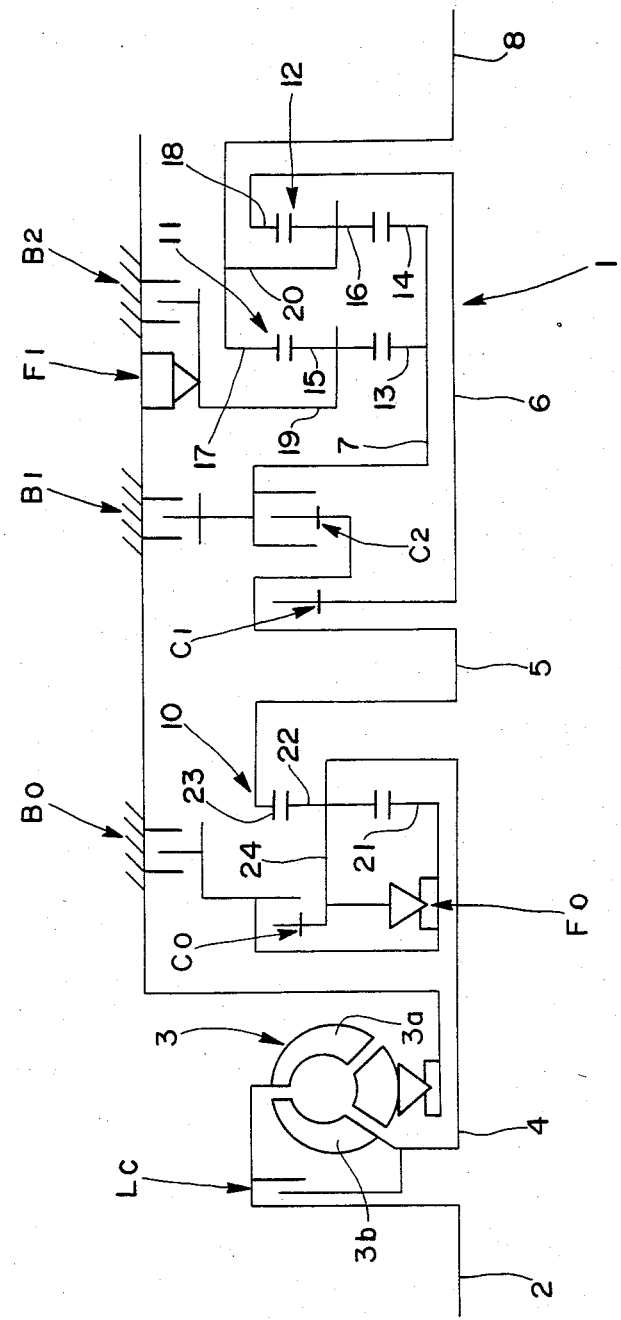
FIG. 2 is a diagrammatical illustration of an automatic power transmission having a torque converter and a planetary gear type multiple stage gear transmission unit.

Referring now to the drawings, particularly to FIG. 2, the automatic power transmission 1 shown therein includes an input shaft 2 which may be an output shaft of an engine, a torque converter 3 having a pump element 3a and a turbine element 3b, and three sets of planetary gear mechanisms 10, 11 and 12, all of which are arranged coaxially with each other. The input shaft 2 is connected with the pump element 3a of the torque converter 3 whereas the turbine element 3b of the torque converter 3 is connected with an input element 4 of the first planetary gear mechanism 10. The input element 4 of the planetary gear mechanism 10 is connected with a planetary pinion carrier 24 on which a suitable number of pinions 22 are rotatably mounted. The pinions 22 are meshed with a sun gear 21 and a ring gear 23.

The sun gear 21 is engaged with the pinion carrier 24 through a one-way clutch $F_0$ so that the former does not rotate faster than the latter. A brake $B_0$ is provided between a transmission casing and the sun gear 21. Further, between the sun gear 21 and the pinion carrier 24, there is provided a clutch $C_0$.

The ring gear 23 of the gear mechanism 10 is connected with an intermediate shaft 5 which is connected on one hand through a clutch $C_1$ with an inner shaft 6 and on the other hand through a clutch $C_2$ with an outer shaft 7 which is rotatably provided around the inner shaft 6. The inner shaft 6 is connected with a ring gear 18 of the third planetary gear mechanism 12, whereas the outer shaft 7 is connected with sun gears 13 and 14 of the second and third planetary gear mechanisms 11 and 12, respectively. A brake $B_1$ is provided between the outer shaft 7 and the casing of the transmission 1.

The sun gear 13 of the second gear mechanism 11 is meshed with pinions 15 which are in turn in mesh with a ring gear 17 formed on a pinion carrier 20 of the third gear mechanism 12. The pinions 15 in the second gear mechanism 11 are rotatably mounted on a pinion carrier 19. Between the pinion carrier 19 and the casing of the transmission, there are provided a one-way clutch $F_1$ and a brake $B_2$. The pinion carrier 20 of the third planetary gear mechanism 12 rotatably mounts a plurality of pinions 16 which are meshed with the sun gear 14 and the ring gear 18. The pinion carrier 20 of the third planetary gear mechanism 12 is connected with an output shaft 8 of the transmission 8.

Between the pump element $3a$ and the turbine element $3b$ of the torque converter 3, there is provided a lock-up clutch LC so that the input shaft 2 can be directly connected with the input member 4 of the first planetary gear mechanism 10.

In FIG. 4, there are shown schedules of engagements of the clutches $C_0$, $C_1$ and $C_2$, the brakes $B_0$, $B_1$ and $B_2$ and the one-way clutches $F_0$ and $F_1$ for selecting a desired gear stage in the gear mechanisms 10, 11 and 12. The operations of the gear mechanisms are well known in the art so that detailed descriptions will not be made further.

Figure 3A:
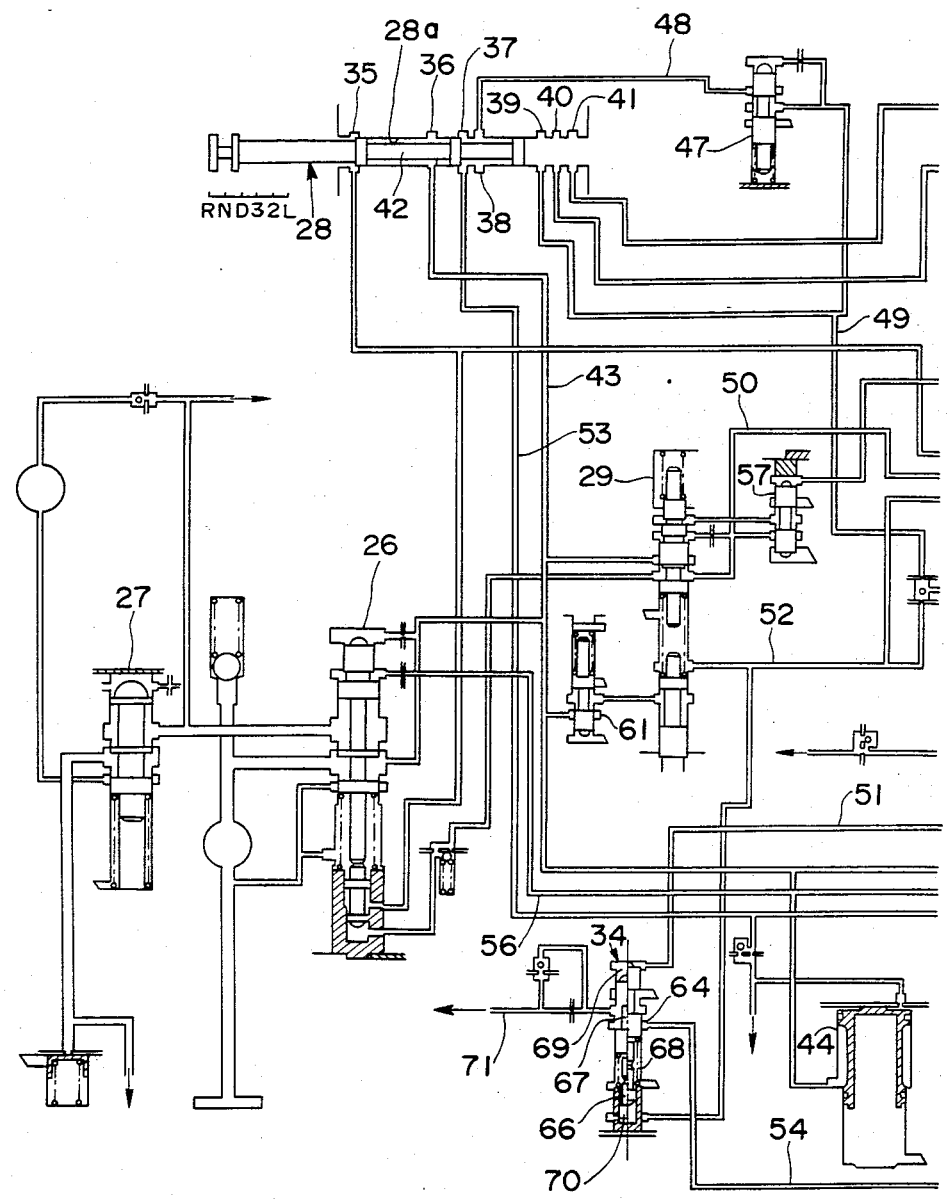
FIGS. 3A and 3B are a hydraulic circuit diagram for controlling the automatic transmission shown in FIG. 2.
Figure 3B:
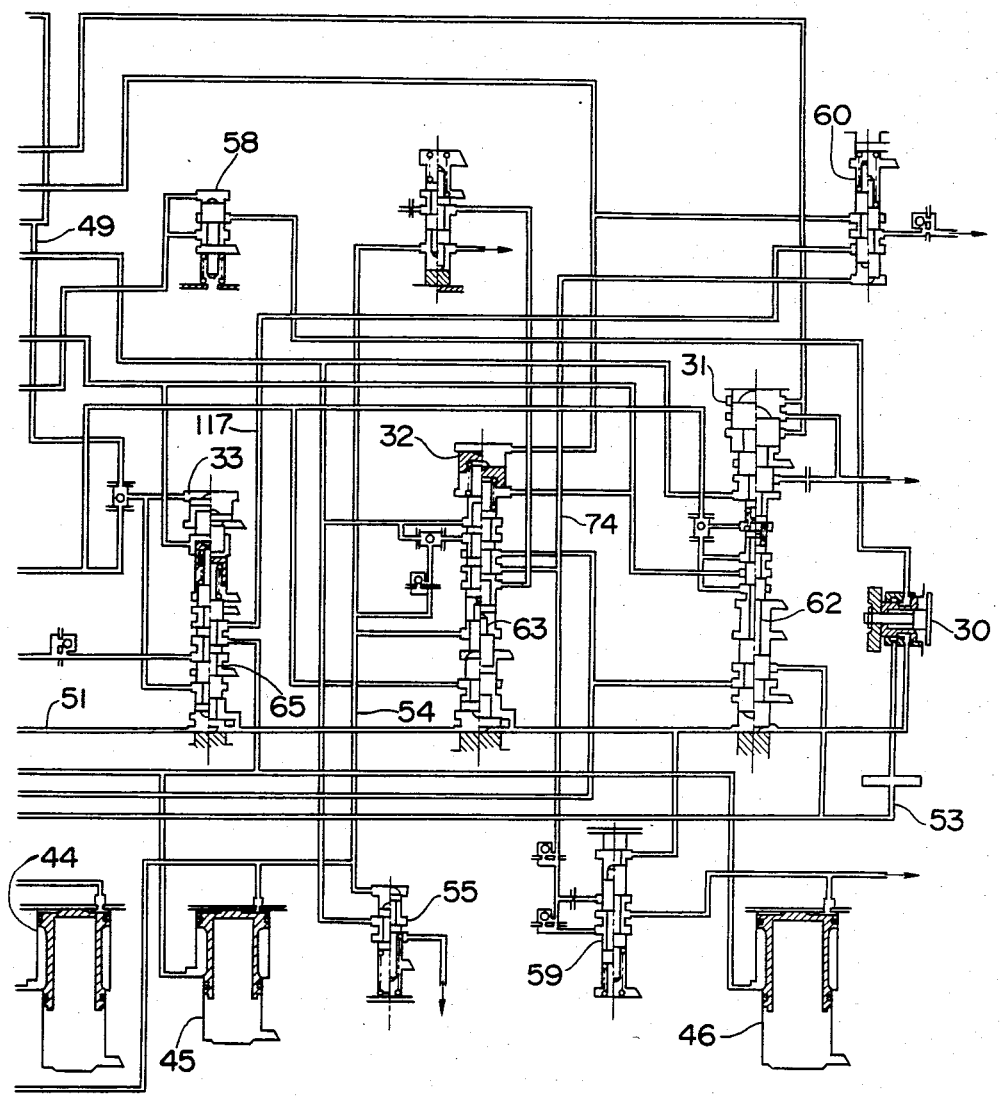

FIGS. 3A and 3B show a hydraulic control circuit for actuating the aforementioned clutches and brakes. The circuit includes a primary pressure regulating valve 26 which provides a hydraulic pressure corresponding to the vehicle speed and the engine throttle valve opening, and a secondary pressure regulating valve 27 for providing a torque converter hydraulic pressure, a lubricating oil pressure and a cooler oil pressure in accordance with the vehicle speed and the throttle valve opening. The control circuit further includes a manual control valve 28, a throttle valve 29, a governor valve 30, a first-to-second shift valve 31, a second-to-third shift valve 32 and a third-to-fourth shift valve 33 which are of conventional arrangements. Further, the control circuit is additionally provided with a lock-up control valve 34.

The manual control valve 28 is formed with a first port 35, a second port 36, a third port 37, a fourth port 38, a fifth port 39, a sixth port 40 and a seventh port 41 opening to an axial bore $28a$. In the axial bore $28a$, there is disposed a plunger 42 for axial sliding movement. The plunger 42 is appropriately formed with lands so as to control communications among ports. A pressure line 43 extends from the primary pressure regulating valve 26 to the second port 36 of the manual control valve 28 as well as to the throttle valve 29, the third-to-fourth shift valve 33 and accummulators 44, 45 and 46 for the clutches $C_1$ and $C_2$ and the brake $B_1$, respectively. The fourth port 38 is connected with the fifth port 39 through a line 48 having a detent pressure regulating valve 47. The line 48 is connected through the detent pressure regulating valve 47 to a line 49 which leads to the third-to-fourth shift valve 33.

A throttle pressure line 50 extends from the throttle valve 29 to the third-to-fourth shift valve 33, the second-to-third shift valve 32 and the second-to-first shift valve 31. A governor pressure line 51 extends from the governor valve 30 to the shift valves 31, 32 and 33. Further, the governor pressure line 51 is connected with the lock-up control valve 34 so that the pressure in the line 51 acts to engage the lock-up clutch LC. A throttle valve kick-down pressure line 52 extends from the throttle valve 29 to the shift valves 33, 32 and 31 and also to the lock-up control valve 34 so that the pressure in the line 52 acts to release the lock up clutch LC.

The third port 37 of the manual control valve 28 is connected with a line 53 which leads to the governor valve 30 and the first-to-second shift valve 31 so that the pressure in the line 53 can be transmitted through the shift valve 31 to the second-to-third shift valve 32. A line 54 extends from the shift valve 32 is connected with a second-to-third shift timing valve 55 which is in turn connected with the clutch $C_2$. The line 54 is further connected with the lock-up control valve 34. A line 56 extends from the first-to-second shift valve 31 to the primary pressure regulating valve 26. A governor pressure regulating valve 58 which is connected with the governor valve 30 functions to provide a governor pressure in accordance with the vehicle speed or the speed of the output shaft 8 and apply the governor pressure to a cut-back valve 37.

The cut-back valve 57 provides a cut-back pressure which is applied to the throttle valve 29. There is provided a third-to-second kick-down orifice control valve 59 which functions to provide a smooth engagement of the brake $B_1$. There is also provided an exhaust valve 60 which functions in case of a down shift from the third gear stage to the second gear stage to increase the engine speed rapidly to a valve suitable to the selected gear stage to thereby weaken the shock which may be produced during the down shift.

In operation, when the manual control valve 28 is in the D position, the second port 36 is brought into communication with the third port 37 so that the line pressure from the primary pressure regulating valve 26 is introduced through the line 43 to the line 53. The pressure in the line 43 is applied to the throttle valve 29, the accummulators 44, 45 and 46 and the third-to-fourth shift valve 33 and further through the shift valve 33 to the clutch $C_0$ to engage the same. The pressure in the line 53 is applied to the clutch $C_1$ to engage the same and further to the first-to-second shift valve 31 and the governor valve 30.

In the first gear stage, the spool 62 of the shift valve 31 takes a lower position as seen in the plane of FIG. 3 but as the vehicle speed is increased, the governor pressure increases to such a valve that the spool 62 of the shift valve 31 is moved to an upper position. Thus, the pressure in the line 53 is introduced into the line 56 and then through the second-to-third shift valve 32 to a line 74 to be applied to the brake $B_1$ and to the exhaust valve 60. Thus, the brake $B_1$ is engaged and the exhaust valve 62 functions to maintain the clutch $C_0$ in the released position.

The pressure in the line 53 is further applied through the line 56 to the primary pressure regulating valve 26 so that the pressure in the line 43 is decreased than under the first gear stage. As the vehicle speed further increases, the governor pressure is increased to such a value that can move the spool 63 in the second-to-third shift valve 32 upwardly. The pressure in the line 53 is then transferred through the shift valves 31 and 32 to the line 54 and applied to the clutch $C_2$ and to the inlet port 64 of the lock-up control valve 34. At the same time, the pressure acting on the exhaust valve 60 through a line 74 is released and a line 117 from the third-to-fourth shift valve 33 is connected with the clutch $C_0$. Thus, the clutch $C_0$ is engaged to provide a third gear stage. As the vehicle speed further increases, the governor pressure functions to move the spool 65 in the shift valve 33 upwardly, the pressure in the line 43 is switched from the clutch $C_0$ to the brake $B_0$ so that a fourth gear stage is selected.

The lock-up control valve 34 has a valve housing formed with an axial bore in which a pair of axially aligned spools 66 and 67 are disposed. Between the spools 66 and 67, there is a spring 68 and a clutch engaging pressure chamber 69 and a clutch releasing pressure chamber 70 are respectively provide above the spool 67 and below the spool 66. The chambers 69 and 70 are respectively connected with the governor pressure line 51 and the throttle valve kick-down pressure line 52. The control valve 34 is further formed with an inlet port 64 which is connected with the line 54 extending from the shift valve 32. The inlet port 64 is so located that it is closed by the spool 67 when the spool 67 takes an upper position but it is opened to a line 71 leading to the lock-up clutch LC when the spool 67 is moved downwards.

When the vehicle speed is low, the governor pressure is also low so that the spool 67 is maintained in the upper position under the influence of the spring 68. Thus, the line 54 is out of communication with the line 71 and the lock-up clutch LC is therefore disengaged to thereby keep the torque converter 3 in operable condition. As the vehicle speed increases, the governor pressure is increased to such a value that it moves the spool 67 downwardly against the action of the spring 68 and the throttle valve kick-down pressure introduced into the chamber 70 from the line 52. Thus, the inlet port 64 is opened to the line 71 and the lock-up clutch LC is therefore engaged to transmit the engine output directly from the engine output shaft 2 to the input member 4 of the gear mechanism 10. In the illustrated embodiment, the pressure to the inlet port 64 of the lock-up control valve 34 is introduced from the second-to-third shift valve 32 when the third gear stage is selected whenever the manual control valve 28 is in the D or 3 position.

Figure 1:
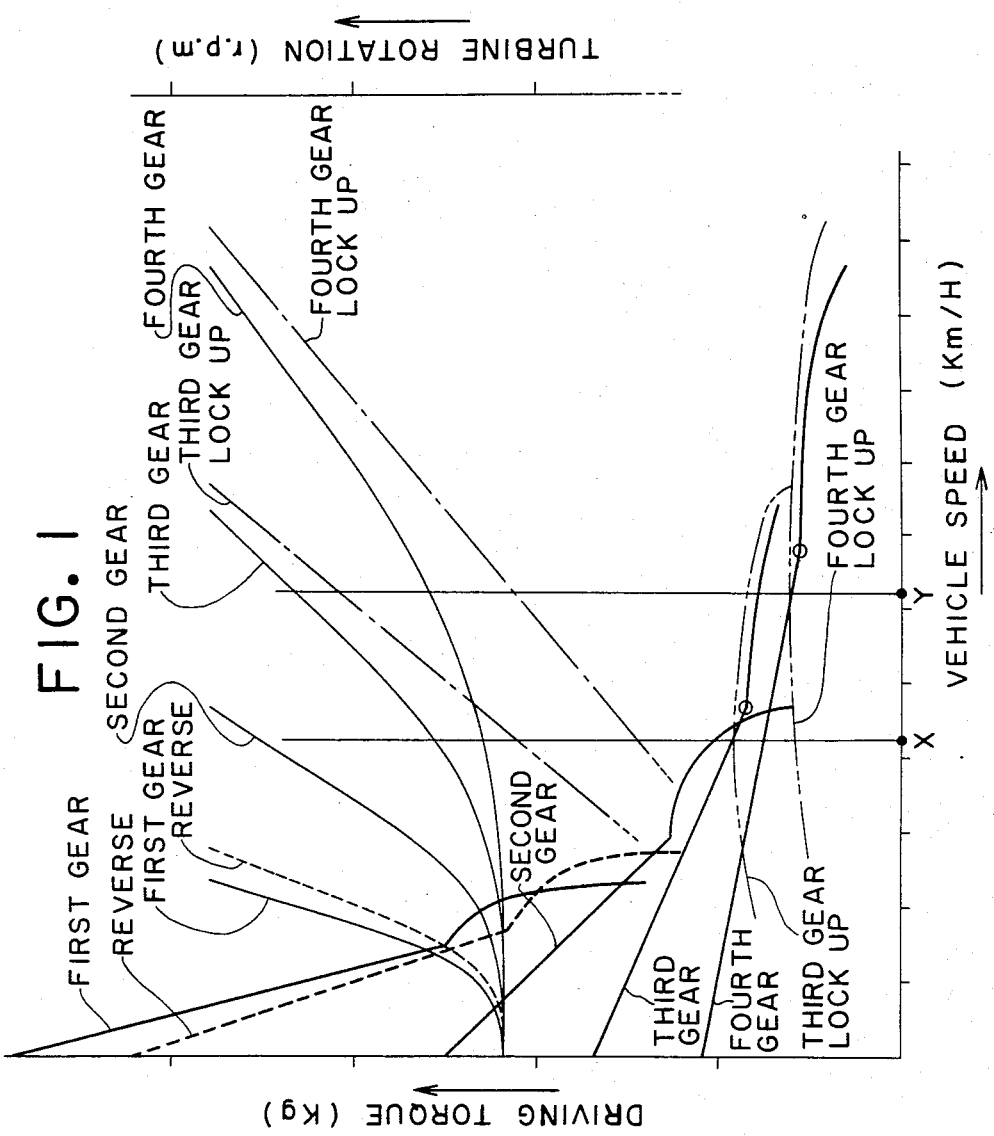
FIG. 1 is a diagram showing the performance of an automatic power transmission having a torque converter and a four stage gear transmission unit.
Figure 5:
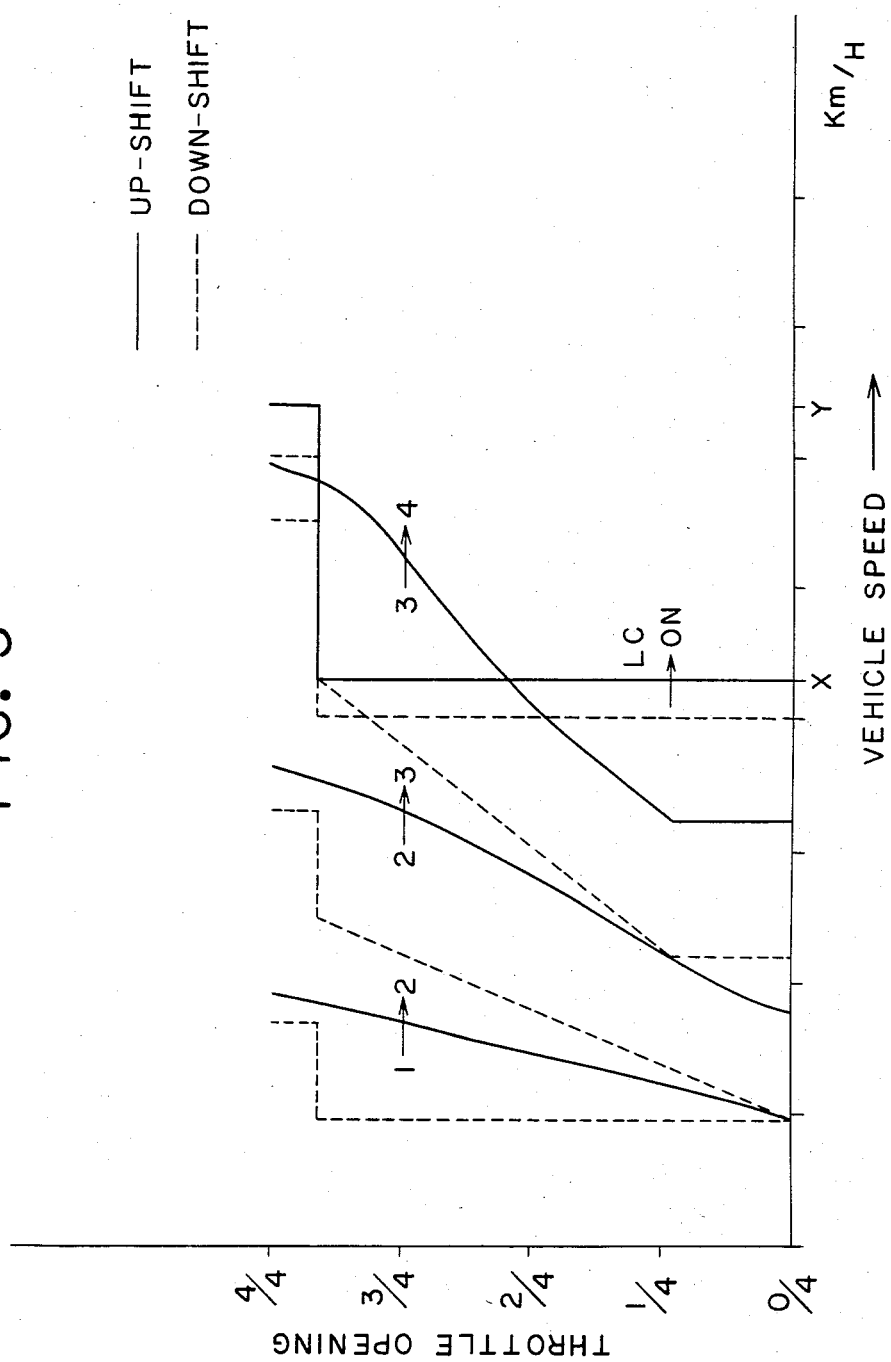

Referring now to FIG. 5, the lock-up clutch LC is engaged at the vehicle speed X under a partial throttle valve opening and at the vehicle speed Y under a full throttle opening. The engagement of the lock-up clutch LC is governed by the difference between the governor pressure in the line 51 and the throttle valve kick-down pressure in the line 52. Thus, the lock-up clutch LC is engaged at a relatively low speed under a partial throttle valve opening which usually takes place under a normal vehicle operation. Thus, it is possible to avoid frictional and slipping loss in the planetary gear mechanisms so that an improved fuel economy is obtained. As shown in FIG. 1, the driving torque becomes larger with the lock-up clutch in engaged condition than with the lock-up clutch disengaged beyond a vehicle speed X under a third gear stage and a vehicle speed Y under a fourth gear stage. Thus, from the viewpoint of acceleration, it is recommendable to engage the lock-up clutch under a high speed range. Therefore, according to the present invention, the lock-up clutch is engaged in a high speed range beyond the vehicle speed of Y under a full throttle valve opening to provide a strong acceleration.

The invention has thus been shown and described with reference to a specific embodiment, however, it should be noted that the invention is in no way limited to the details of the illustrated arrangements but changes and modifications may be made without departing from the scope of the appended claims.

I claim:

1. An automatic power transmission comprising:
    a fluid-type torque converter driven by an engine output shaft;
    a multiple stage gear transmission having an input element operatively connected to said torque converter, said gear transmission including selectively operable clutch and brake means for providing a plurality of gear trains having different gear ratios;
    hydraulic control circuit means for selectively operating said clutch and brake means, said hydraulic control circuit means including a line communicating governor pressure corresponding to vehicle speed and a line communicating throttle valve kick-down pressure;
    lock-up clutch means provided between said output shaft and said input element; and
    lock-up clutch control means for controlling said lock-up clutch means and including means operable under a pressure difference between said governor pressure and said throttle valve kick-down pressure, said pressure difference operable means including axially movable spool means axially separating first and second pressure chamber means, first means for introducing said governor pressure into said first pressure chamber means, and second means for introducing said throttle valve kick-down pressure into said second pressure chamber means.

2. An automatic power transmission in accordance with claim 1 in which said gear transmission unit includes at least three stages which are selected by first-to-second shift valve means and second-to-third shift valve means, and said lock-up clutch control means is associated with a pressure line for supplying a pressurized hydraulic fluid to said lock-up clutch means through said second-to-third shift valve means and said pressure difference operable means.

3. An automatic transmission in accordance with claim 1 in which said spool means includes a first spool adjacent to said first chamber means and a second spool adjacent to said second chamber means, and spring means being provided for forcing the first spool toward said first chamber means.

4. An automatic transmission in accordance with claim 1 in which said spool means includes a first spool adjacent to said first chamber means and a second spool adjacent to said second chamber means, and spring means being provided for forcing the first spool toward said first chamber means, said pressure difference operable means including port means which is adapted to be opened to thereby engage said lock-up clutch means, said port means being opened when said governor pressure in said first chamber means exeeds the force of said spring means and the throttle valve kick-down pressure in said second chamber means.

5. An automatic transmission in accordance with claim 4 in which said gear transmission unit includes at least three stages which are selected by first-to-second shift valve means and second-to-third shift valve means, and said lock-up clutch control means is associated with a pressure line for supplying a pressurized hydraulic fluid to said lock-up clutch means through said second-to-third shift valve means and said port means.

* * * * *